US012589334B2

(12) United States Patent
Day

(10) Patent No.: US 12,589,334 B2
(45) Date of Patent: Mar. 31, 2026

(54) AUTOMATED SKIMMER SYSTEM

(71) Applicant: Howard Day, Houston, TX (US)

(72) Inventor: Howard Day, Houston, TX (US)

( * ) Notice: Subject to any disclaimer, the term of this patent is extended or adjusted under 35 U.S.C. 154(b) by 0 days.

(21) Appl. No.: 18/819,731

(22) Filed: Aug. 29, 2024

(65) Prior Publication Data

US 2026/0061340 A1 Mar. 5, 2026

(51) Int. Cl.
| | |
|---|---|
| *B01D 21/24* | (2006.01) |
| *B01D 21/30* | (2006.01) |
| *B01D 21/34* | (2006.01) |
| *C02F 1/00* | (2023.01) |
| *C02F 1/40* | (2023.01) |
| *E04H 4/12* | (2006.01) |
| *C02F 103/42* | (2006.01) |

(52) U.S. Cl.
CPC ....... *B01D 21/2433* (2013.01); *B01D 21/302* (2013.01); *B01D 21/34* (2013.01); *C02F 1/008* (2013.01); *C02F 1/40* (2013.01); *E04H 4/1272* (2013.01); *C02F 2103/42* (2013.01); *C02F 2209/44* (2013.01)

(58) Field of Classification Search
None
See application file for complete search history.

(56) References Cited

U.S. PATENT DOCUMENTS

| | | | |
|---|---|---|---|
| 6,029,290 A | 2/2000 | Butcher et al. | |
| 7,402,242 B2 | 7/2008 | Duckett | |
| 7,485,235 B2 | 2/2009 | Kellett | |
| 8,241,506 B1 | 8/2012 | Vernier et al. | |

(Continued)

FOREIGN PATENT DOCUMENTS

| | | |
|---|---|---|
| CN | 206368355 U | 8/2017 |
| CN | 110565605 B | 12/2019 |
| CN | 211141572 | 7/2020 |

OTHER PUBLICATIONS

Unknown, "Designing the ultimate leaf-eating filtration—help needed", a forum post obtained from URL https://www.koiphen.com/forums/showthread.php?156615-Designing-the-ultimate-leaf-eating-filtration-help-needed&s=a06fd27b7d4477811c19f878221ffd8e on Mar. 31, 2022.

(Continued)

*Primary Examiner* — Richard C Gurtowski

(74) *Attorney, Agent, or Firm* — Basil M. Angelo; ANGELO IP

(57) ABSTRACT

An automated skimmer system includes a skimmer mouth comprising a conveyor ledge, a conveyor at least partially disposed under the conveyor ledge having a paddle wheel and a water-porous conveyor belt disposed about the paddle wheel, a conveyor debris collector disposed lower than the conveyor at a discharge end of the conveyor having a vacuum connection port, and a vacuum fluidly connected to the vacuum connection port. Water entering the skimmer mouth falls off the conveyor ledge, through the conveyor belt, onto the paddle wheel causing the paddle wheel to rotate and the conveyor belt to direct debris toward the conveyor debris collector for automated removal. The vacuum may be activated according to a predetermined interval, a predetermined schedule, or based on level sensor data to ensure that the automated skimmer system does not become clogged, without requiring manual intervention.

13 Claims, 13 Drawing Sheets

(56)     References Cited

U.S. PATENT DOCUMENTS

| | | | |
|---|---|---|---|
| 10,550,593 B2 | 2/2020 | Lauletta et al. | |
| 10,731,366 B1 | 8/2020 | Krombein | |
| 2007/0222957 A1* | 9/2007 | Nagasaka | G03F 7/70341 |
| | | | 355/53 |
| 2013/0126448 A1* | 5/2013 | McCabe | B01D 17/0211 |
| | | | 210/801 |
| 2017/0044785 A1* | 2/2017 | Angelino | E04H 4/1272 |
| 2018/0251993 A1 | 9/2018 | Irvine | |

OTHER PUBLICATIONS

PCT International Search Report of International Search Authority (USPTO) issued in PCT Int'l Application PCT/US2025/043837, filed on Aug. 28, 2025, mailed on Oct. 14, 2025.

PCT Written Opinion of International Search Authority (USPTO) issued in PCT Int'l Application PCT/US2025/043837, filed on Aug. 28, 2025, mailed on Oct. 14, 2025.

* cited by examiner

200

320

320

340

300

320

600

350

345

310

310

315

320

530

320

335

320

500

340

300

600

200

AUTOMATED SKIMMER SYSTEM

BACKGROUND OF THE INVENTION

Swimming pools and other bodies of water, including, for example, fountains, ponds, and tanks, rely on a circulation system to prevent stagnation and maintain the cleanliness of the water. A conventional circulation system typically includes one or more drains, skimmers, suction lines, pumps, filters, sanitizers, and return jets that work together to circulate water and distribute chemicals that are used to maintain water clarity, balance, and hygiene. As part of the circulation system, one or more skimmer systems are used to trap debris and prevent it from entering and damaging the pump and other downstream systems. Each skimmer system includes a suction line disposed under a removable skimmer basket that provides suction to draw water into the skimmer. The suction line sucks water through the holes or mesh of the skimmer basket into the circulation system while trapping debris in the skimmer basket for manual removal.

SUMMARY OF THE INVENTION

According to one aspect of one or more embodiments of the present invention, an automated skimmer system includes a skimmer mouth comprising a conveyor ledge, a conveyor at least partially disposed under the conveyor ledge having a paddle wheel and a water-porous conveyor belt disposed about the paddle wheel, a conveyor debris collector disposed lower than the conveyor at a discharge end of the conveyor having a vacuum connection port, and a vacuum fluidly connected to the vacuum connection port. Water entering the skimmer mouth falls off the conveyor ledge, through the conveyor belt, onto the paddle wheel causing the paddle wheel to rotate and the conveyor belt to direct debris toward the conveyor debris collector for automated removal. The vacuum may be activated according to a predetermined interval, a predetermined schedule, or based on level sensor data to ensure that the automated skimmer system does not become clogged, without requiring manual intervention.

Other aspects of the present invention will be apparent from the following description and claims.

DETAILED DESCRIPTION OF THE INVENTION

Figure 1:
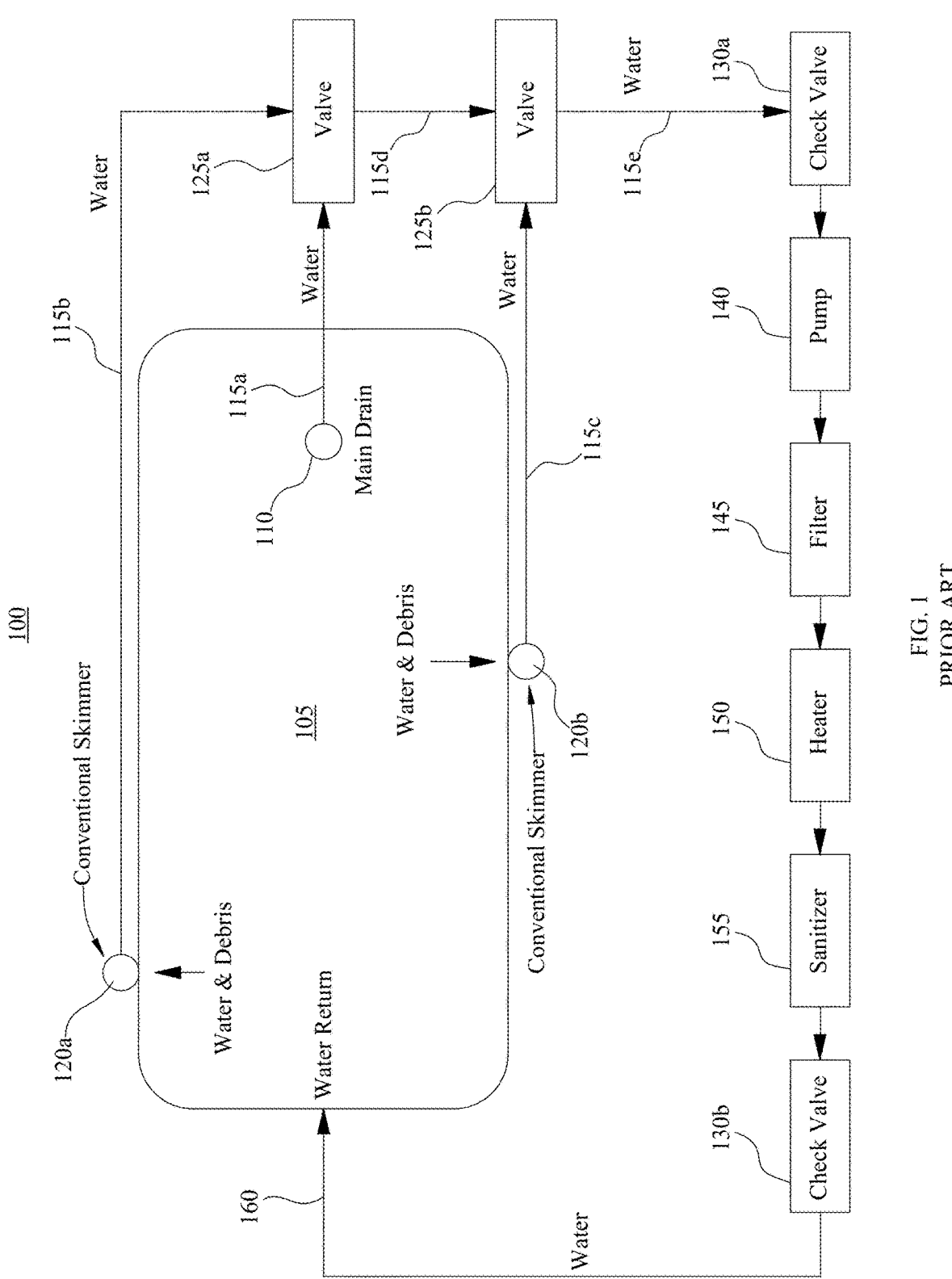
FIG. 1 shows a conventional circulation system for a swimming pool.

One or more embodiments of the present invention are described in detail with reference to the accompanying figures. For consistency, like elements in the various figures are denoted by like reference numerals. In the following detailed description of the present invention, specific details are described to provide a thorough understanding of the present invention. In other instances, aspects that are well-known to those of ordinary skill in the art are not described to avoid obscuring the description of the present invention.

FIG. 1 shows a schematic of a conventional circulation system 100 for a swimming pool 105 or other body (not shown) of circulated water that is used to prevent stagnation and maintain the cleanliness of the water. Circulation system 100 includes one or more main drains 110, suction lines 115, skimmers 120, pumps 140, filters 145, optional heaters 150, sanitizers 155, and return jets (not independently illustrated) that work together to circulate water and distribute chemicals that are used to maintain water clarity, balance, and hygiene. Circulation system 100 draws water from main drain 110 and the one or more skimmer systems 120a, 120b into pump 140, filtration 145, optional heater 150, and sanitizer 155 systems, which are typically disposed outside of pool 105.

Circulation system 100 relies on a plurality of suction lines 115 to draw water into the various subsystems. In the example depicted, suction line 115a is disposed below main drain 110, suction line 115b is disposed below a removable skimmer basket (not independently illustrated) of skimmer system 120a, and suction line 115c is disposed below a removable skimmer basket (not independently illustrated) of skimmer system 120b. Depending on the design of a particular application, one or more valves 125 may be used to fluidly connect one or more suction lines 115. In the example depicted, valve 125a fluidly connects suction line 115a and suction line 115b into suction line 115d and valve 125b fluidly connects suction line 115c and suction line 115d into consolidated suction line 115e. Consolidated suction line 115e is fluidly connected to check valve 130a that prevents backflow and fluidly connects suction line 115e to pump 140. Pump 140 includes a motor (not shown) that rotates an impeller (not shown) to create a vacuum that pulls water into a chamber (not shown) and then pushes the water out for eventual return to pool 105. In this way, pump 140 pulls water from pool 105 via a plurality of suction lines 115 and pushes water through filter 145, optional heater 150, and sanitizer 155, prior to returning the water to pool 105 via one or more return lines 160. Filter 145 includes fine screens (not shown) to filter out particulate matter, potentially including bacteria, which bypasses main drain 110 and skimmer systems 120a, 120b. Optional heater 150 is used to increase the temperature of the water, if desired in a particular application. Sanitizer 155 introduces chemicals to the water to eliminate harmful pathogens, prevent algae growth, maintain water clarity, and balance water chemistry, including, for example, one or more of sanitizers including chlorine, alkalinity adjusters, calcium hardness adjusters, algaecides, clarifiers, and shock treatments. Check valve 130b fluidly connects sanitizer 155 to one or more return lines 160 that returns the water back into pool 105 via one or more jets (not shown).

As part of circulation system 100, one or more skimmer systems 120a, 120b are used to trap debris and prevent it from entering and damaging pump 140 and other equipment downstream of pump 140. Each skimmer system 120a, 120b includes a suction line 115c, 115d disposed under a removable skimmer basket (not shown) that provides suction to draw water into skimmers 120a, 120b. Suction lines 115c, 115d suck water through the holes or mesh (not independently illustrated) of their respective removable skimmer baskets (not shown), while trapping debris in the skimmer basket and preventing it from entering and damaging pump 140, filter 145, optional heater 150, and sanitizer 155 systems. When the removable skimmer baskets (not shown) become full, they must be manually removed by the caretaker to empty the debris disposed therein.

Conventional skimmer baskets (not independently illustrated) of conventional skimmer systems 120a, 120b often become clogged by leaves, needles, and other debris that reduces the ability of their respective suction lines (not independently illustrated) to draw water into circulation system 100 and further leaves, needles, and other debris into the skimmer baskets (not independently illustrated), often resulting in extensive damage to pump 140 and other equipment downstream of pump 140. In addition to reducing the flow of water necessary for circulation, clogged skimmer baskets (not independently illustrated) force pump 140 to work harder which can lead to overheating, increased wear and tear, and reduction in the operational lifespan, of pump 140. Further, if the skimmer baskets (not independently illustrated) are sufficiently clogged, pump 140 draws in air rather than water creating air pockets that damage pump 140 and other equipment downstream of pump 140. This is particularly problematic in the fall season when trees and shrubbery shed a substantial volume of leaves, needles, and other debris in a relatively short amount of time. In pools 105 disposed near such trees and shrubbery, the leaves, needles, and other debris may quickly clog the skimmer baskets (not independently illustrated) in a matter of mere hours. Once clogged, suction lines 115b, 115c of conventional skimmer systems 120a, 120b cannot effectively draw water into circulation system 100, reducing the effectiveness of circulation system 100 and the ability of conventional skimmer systems 120a, 120b to draw in further leaves, needles, and other debris, which leads to deterioration of the pool water due to stagnation. In order to prevent damage to pump 140 and other equipment downstream of pump 140 due to clogging, the skimmer baskets (not independently illustrated) of conventional skimmer systems 120a, 120b must be removed and emptied on a frequent basis, perhaps as much as every hour or two during times of heavy debris droppage. This requires significant on-site attention by the caretaker and prevents the caretaker from being away from pool 105 for any substantive length of time. For example, if the caretaker happens to be away from pool 105 for mere hours or days when there is heavy debris felled into pool 105, the clogging of conventional skimmer systems 120a, 120b, may result in the failure of, or damage to, pump 140 and stagnation of the pool water, such that the caretaker may return to a broken pump 140 and unclean water in a poor condition that requires extensive remediation.

Accordingly, in one or more embodiments of the present invention, an automated skimmer system uses a paddle wheel that relies on the flow of water provided by the pump to drive an otherwise unpowered conveyor that directs debris into a vacuum compartment for automated removal by a vacuum system for storage in a large container, thereby preventing clogging and enabling the caretaker to safely be away from the pool for an extended period of time. An automated skimmer system includes a conveyor having a paddle wheel and a water-porous conveyor belt disposed about the paddle wheel that directs debris from the skimmer mouth toward a conveyor debris collector having a vacuum connection port for connection to the vacuum system. Advantageously, the vacuum system of the automated skimmer system may be automatically activated according to a predetermined interval, a predetermined schedule, or based on level sensor data corresponding to the state of the conveyor debris collector to ensure that debris is automatically removed without clogging the automated skimmer system and without manual intervention by the caretaker. The conveyor debris collector as well as the vacuum system connected thereto may be sized such that they enable automated debris removal for days or weeks at a time before requiring intervention by the caretaker. The conveyor of the automated skimmer system may be removed in months where there is little to no debris, in which case the automated skimmer system may operate in a similar manner to a conventional skimmer system, directly all debris into the removable skimmer basket of the automated skimmer system.

Figure 2B:
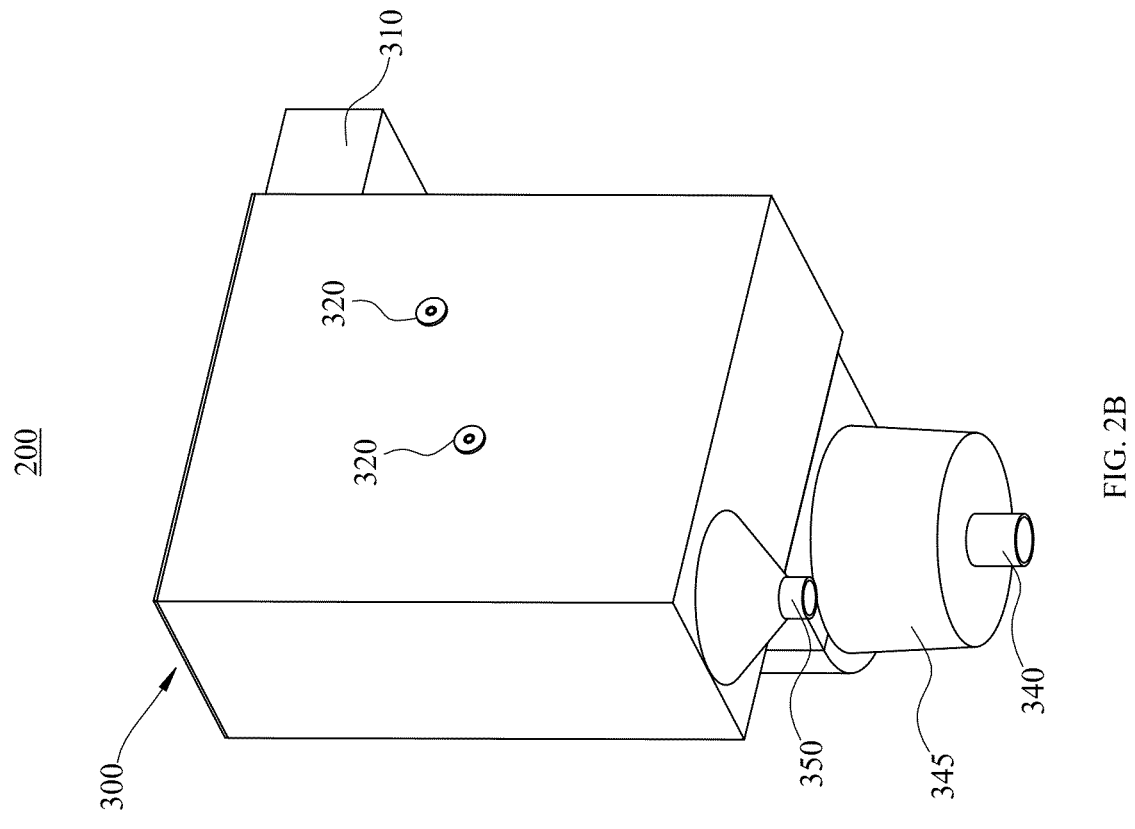
FIG. 2B shows a rear-facing bottom perspective view of the automated skimmer system in accordance with one or more embodiments of the present invention.
Figure 2A:
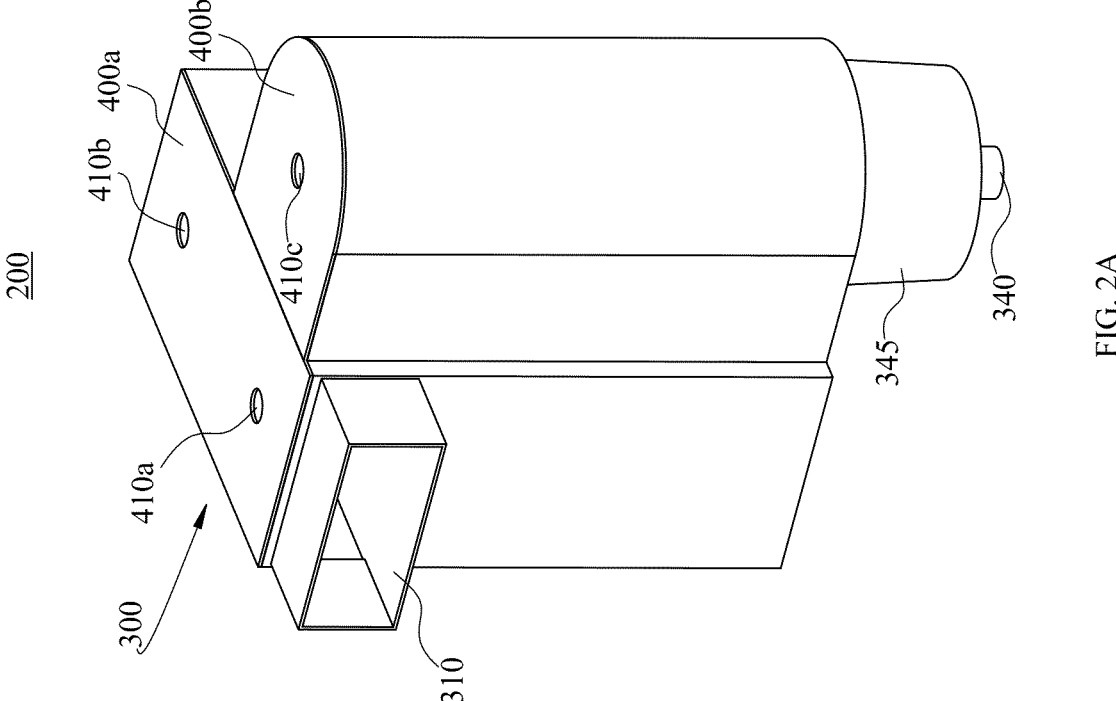
FIG. 2A shows a front-facing top perspective view of an automated skimmer system in accordance with one or more embodiments of the present invention.

FIG. 2A shows a front-facing top perspective view of an automated skimmer system 200 in accordance with one or more embodiments of the present invention. Automated skimmer system 200 is intended to replace a conventional skimmer system in the design of swimming pools or other bodies of circulated water, maintaining the functionality of a conventional skimmer system with respect to circulation, but redirecting debris to a conveyor debris collection area fluidly connection to a vacuum for automated debris removal. Automated skimmer system 200 may include a housing 300 having a skimmer mouth 310 for receiving water into skimmer system 200. Similar to a conventional skimmer system, skimmer mouth 310 may be disposed such that at least a portion of it is under the water line of the swimming pool or other body of circulated water such that the circulation system may draw water into skimmer mouth 200. Automated skimmer system 200 may include a conveyor maintenance lid 400a that includes one or more finger holes 410a, 410b that may be used to remove lid 400a for maintenance and/or removal of the conveyor (not independently illustrated). Similarly, automated skimmer system 200 may include a skimmer basket lid 400b that includes one or more finger holes 410c that may be used to remove lid 400b to gain access to a removable skimmer basket (not independently illustrated) disposed in a skimmer basket receiver area 345 of housing 300. One of ordinary skill in the art, having the benefit of this disclosure, will recognize that, housing 300 is merely representative of an embodiment and the size and shape of housing 300 may vary based on an application or design in accordance with one or more embodiments of the present invention. Further, while conveyor maintenance lid 400a and skimmer basket lid 400b are shown as discrete pieces, they may be configured as a single unibody piece in other applications or designs of housing 300 in accordance with one or more embodiments of the present invention.

Figures 2C, 2D:
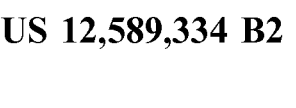
FIG. 2C shows a top plan view of the automated skimmer system without lid in accordance with one or more embodiments of the present invention.
FIG. 2D shows a bottom plan view of the automated skimmer system in accordance with one or more embodiments of the present invention.

Continuing, FIG. 2B shows a rear-facing bottom perspective view of the automated skimmer system 200 in accordance with one or more embodiments of the present invention. As shown in this view, suction line connection port 340 is shown as well as vacuum connection port 350, which is fluidly connected to the conveyor debris collector (not independently illustrated), as described in more detail herein. Continuing, FIG. 2C shows a top plan view of the automated skimmer system 200 with lids 400a and 400b removed in accordance with one or more embodiments of the present invention. As shown in this view, water may be drawn into skimmer mouth 310, over conveyor ledge 315 until the water falls off conveyor ledge 315 onto conveyor 500. While not shown in this view, conveyor 500 may include a paddle wheel (not independently illustrated) and water-porous conveyor belt 530 disposed about the paddle wheel. Because conveyor 500 is disposed at least partially under conveyor ledge 315, the water falling off conveyor ledge 315 falls through water-porous conveyor belt 530 and causes the paddle wheel to rotate enabling conveyor 500 to direct debris toward conveyor debris collector 335, which is fluidly connected to vacuum connection port 340. A removable skimmer basket 600 may be disposed in a skimmer basket receiver area 345 of housing 300 disposed to the side of conveyor 500 to provide the necessary suction to draw water into skimmer mouth 310 and conveyor 500. While not shown in this view, housing 300 may include a water return channel disposed under conveyor 500 that fluidly communicates water to removable skimmer basket 600 for return to circulation via the suction line port (e.g., 350) disposed thereunder. In certain embodiments, automated skimmer 200 may include one or more axle mounts 320 that may be used to secure the paddle wheel (e.g., 510 of FIG. 4) and the optional roller (e.g., 520 of FIG. 4) of conveyor 500 to housing 300. In other embodiments, the axles of the paddle wheel (e.g., 510 of FIG. 4) and the optional roller (e.g., 520 of FIG. 4) of conveyor 500 may be spring loaded, like toilet paper rollers, to secure conveyor 500 to housing 300 and permit the quick and easy removal and reinstallation of conveyor 500. During the months where there is very little debris droppage, the lid (e.g., 400a of FIG. 2A) may be removed and the spring-loaded axles enable the quick and easy removal of conveyor 500 from automated skimmer system 200, thereby enabling automated skimmer system 200 to operate in a similar manner to a conventional skimmer system (e.g., 100 of FIG. 1). Conveyor 500 may be easily reinstalled when needed by reversing the process. One of ordinary skill in the art, having the benefit of this disclosure, will appreciate that the type or kind of mount used for the one or more axles of conveyor 500 may vary based on an application or design in accordance with one or more embodiments of the present invention.

Continuing, FIG. 2D shows a bottom plan view of the automated skimmer system 200 in accordance with one or more embodiments of the present invention. As shown in this view, vacuum connection port 340 provides fluid communication between the conveyor debris collector (e.g., 335 of FIG. 3B) and the vacuum system (e.g., 705 of FIG. 5) that could be disposed near the other pool equipment. Similarly, suction line port 350 provides fluid communication between removable skimmer basket 600 and the pump (e.g., 140 of FIG. 5) that provides the suction.

Figures 2E, 2F:
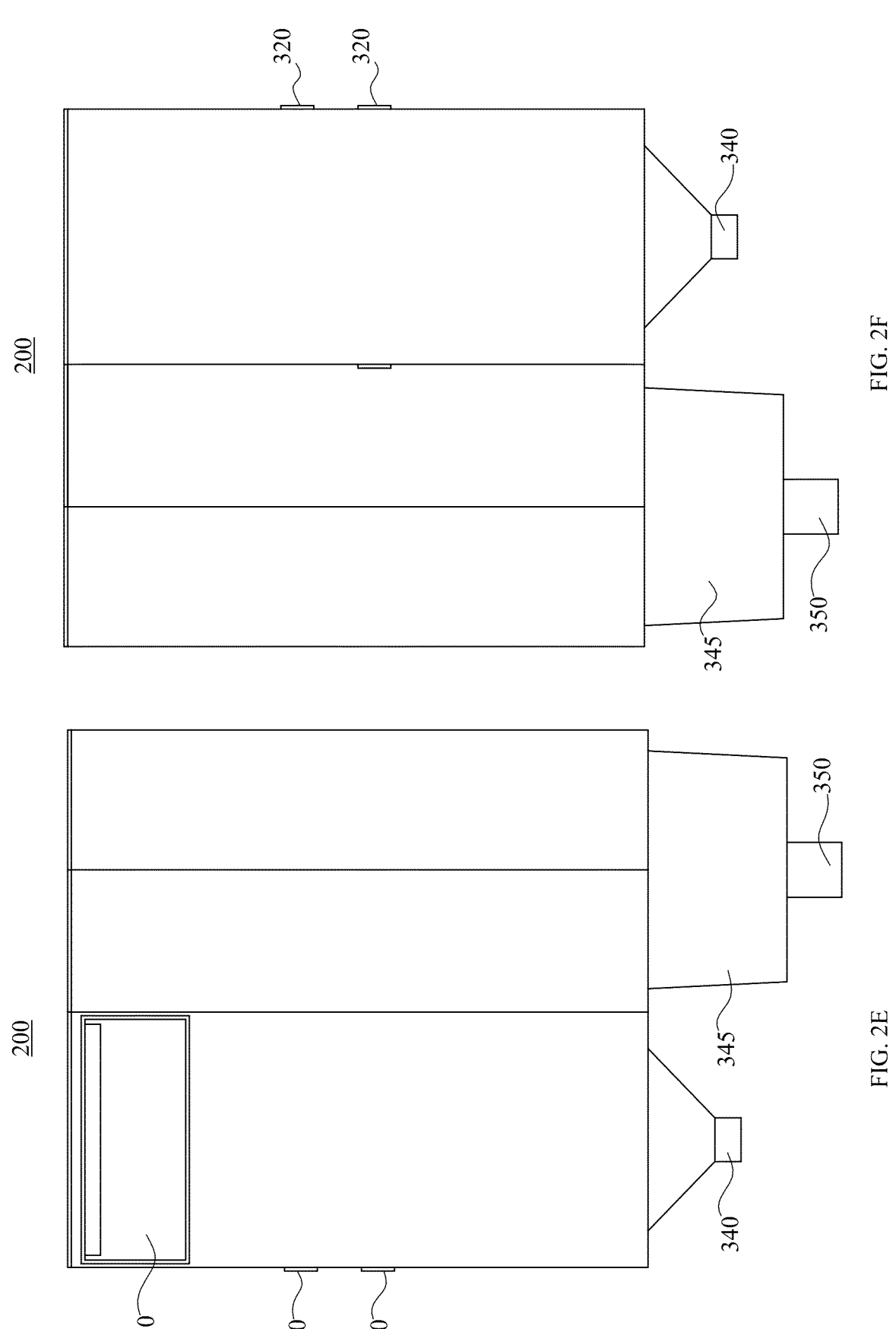
FIG. 2E shows a front elevation of the automated skimmer system in accordance with one or more embodiments of the present invention.
FIG. 2F shows a rear elevation of the automated skimmer system in accordance with one or more embodiments of the present invention.
Figures 2G, 2H:
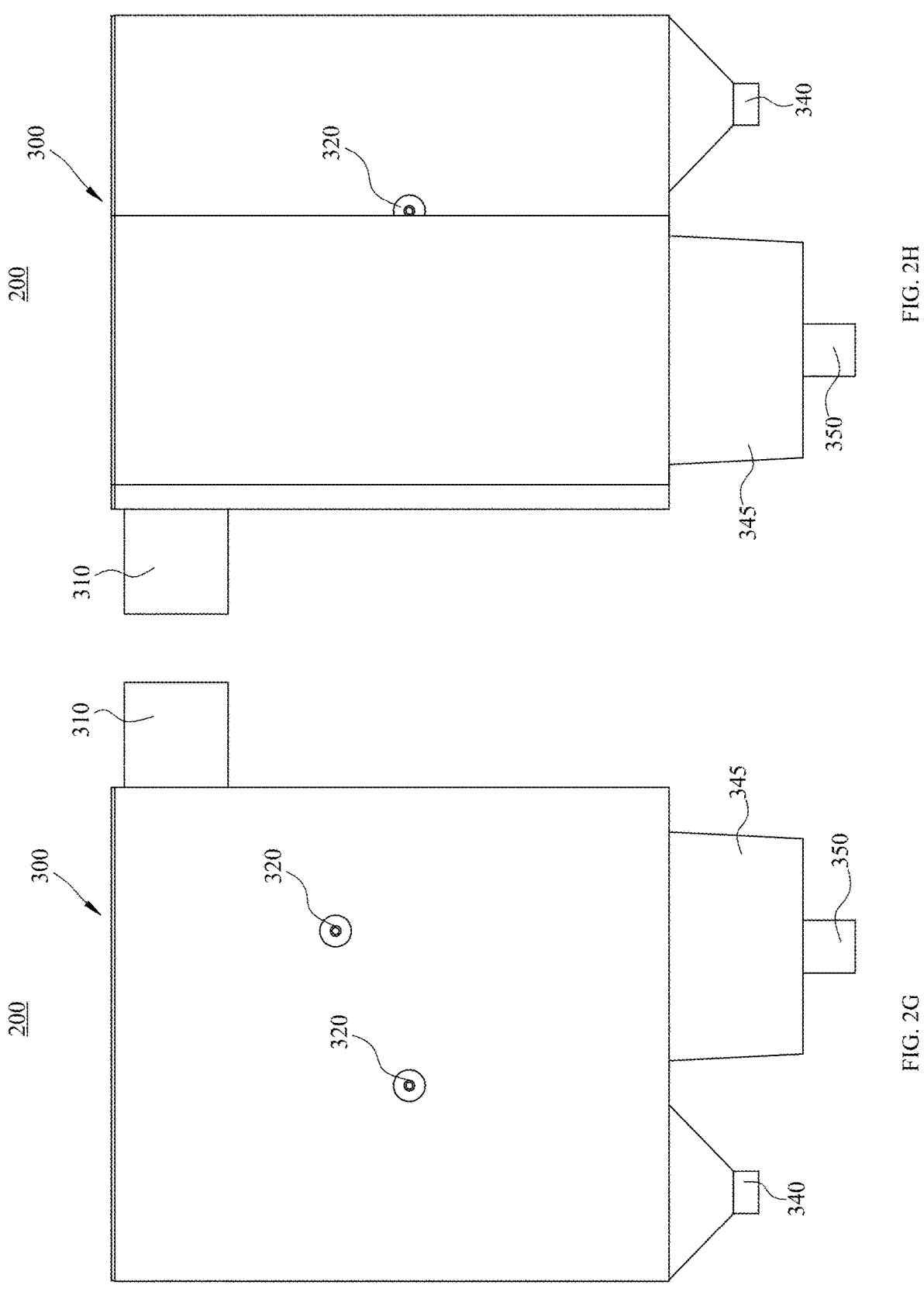
FIG. 2G shows a left elevation of the automated skimmer system in accordance with one or more embodiments of the present invention.
FIG. 2H shows a right elevation of the automated skimmer system in accordance with one or more embodiments of the present invention.

Continuing, FIG. 2E shows a front elevation of the automated skimmer system 200 in accordance with one or more embodiments of the present invention. Continuing, FIG. 2F shows a rear elevation of the automated skimmer system 200 in accordance with one or more embodiments of the present invention. Continuing, FIG. 2G shows a left elevation of the automated skimmer system 200 in accordance with one or more embodiments of the present invention. Continuing, FIG. 2H shows a right elevation of the automated skimmer system 200 in accordance with one or more embodiments of the present invention.

Figure 3A:
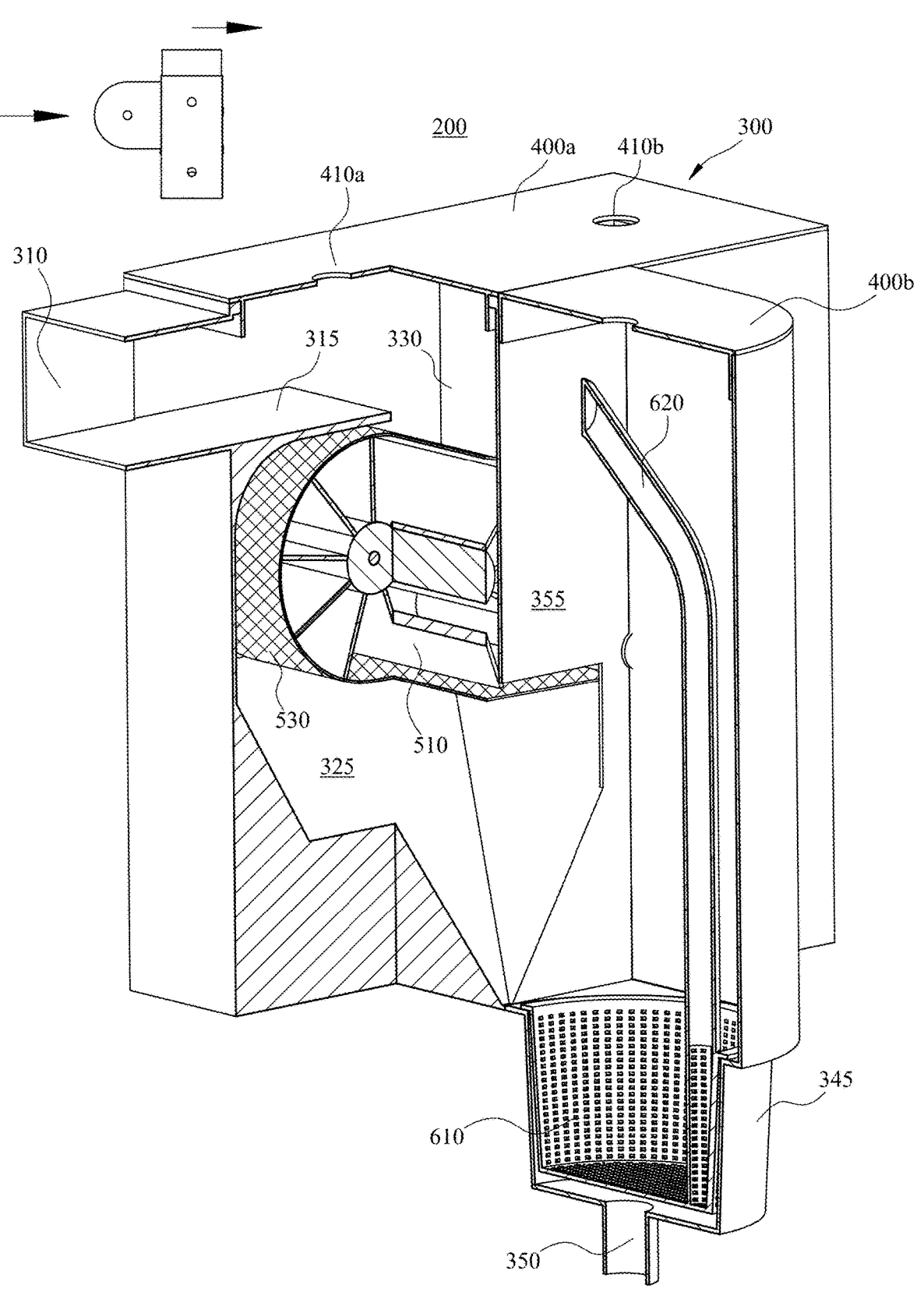
FIG. 3A shows front-facing partial-sectional perspective view of an automated skimmer system in accordance with one or more embodiments of the present invention.
Figure 3B:
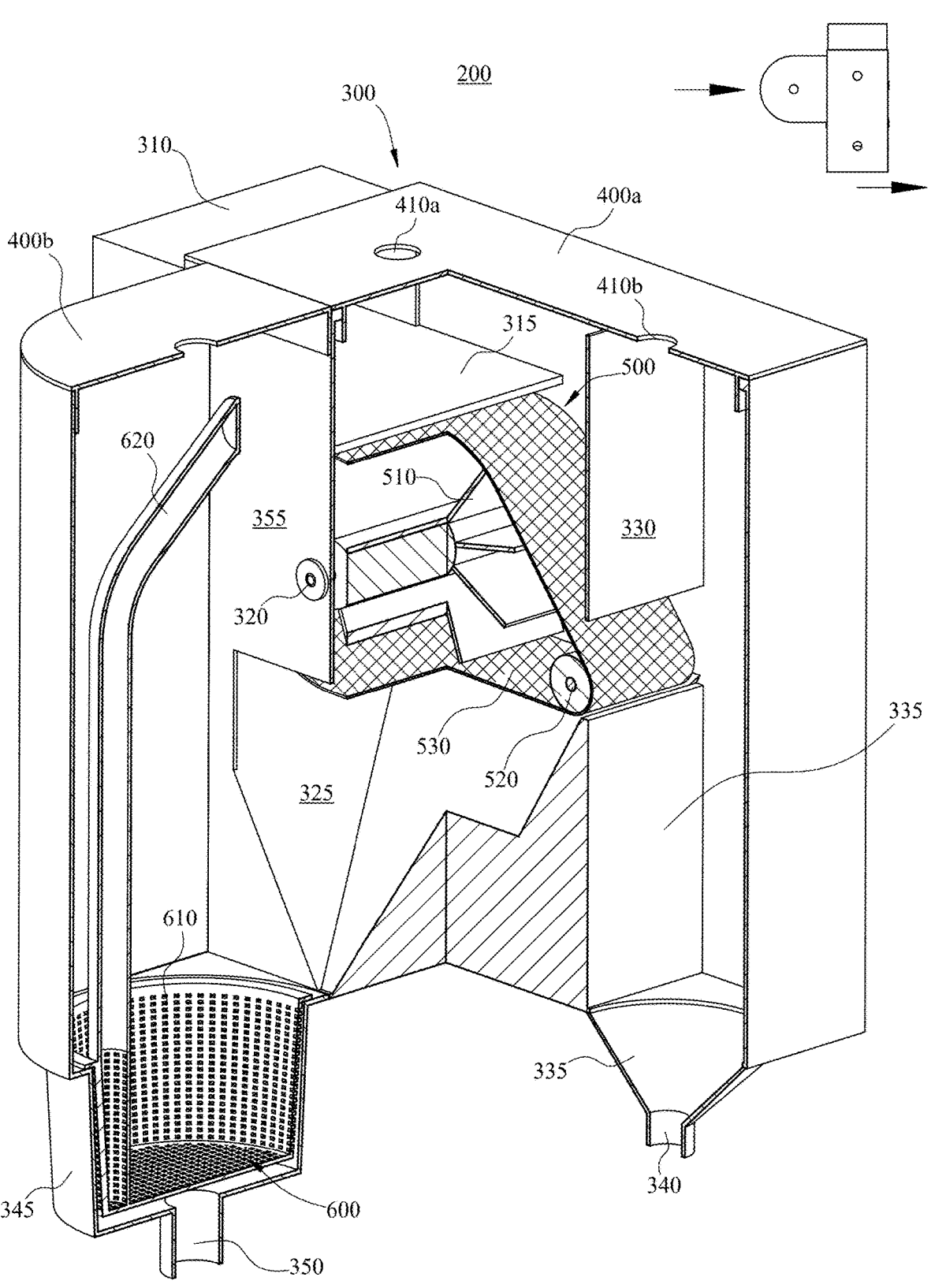
FIG. 3B shows rear-facing partial-sectional perspective view of the automated skimmer system in accordance with one or more embodiments of the present invention.

FIG. 3A shows front-facing partial-sectional perspective view of the automated skimmer system 200 in accordance with one or more embodiments of the present invention. As shown in this view, water may enter skimmer mouth 310 and fall off conveyor ledge 315 onto conveyor 500 and through water-porous conveyor belt 530 causing paddle wheel 510 to rotate. The water that falls through water-porous conveyor belt 530 may be directed through water return channel 325 toward water-porous basket 610 of removable skimmer basket 600 for return to circulation via suction line port 350. Housing 300 may include additional internal barriers including, for example, conveyor debris collector barrier 330 and suction line barrier 355 that ensure the directional flow of debris toward the conveyor debris collector (not shown) and the return of water to circulation via suction line port 350. Continuing, FIG. 3B shows rear-facing partial-sectional perspective view of an automated skimmer system 200 in accordance with one or more embodiments of the present invention. Conveyor 500 may be at least partially disposed under conveyor ledge 315 to ensure that water falls through conveyor 500. Conveyor 500 may include one or more paddle wheels 510, one or more optional rollers 520, and a water-porous conveyor belt 530. Housing 300 may include a conveyor debris collector 335 area disposed lower than conveyor 500 at a discharge end of conveyor 500 and may include a vacuum connection port 340 for automated debris removal. Housing 300 may include a water return channel 325 disposed under conveyor 500, a conveyor debris collector barrier 330 disposed sufficiently above the discharge end of conveyor 500 to permit the flow of debris, and a skimmer basket receiver 345 configured to receive a removable skimmer basket 600 disposed in a location to the side of conveyor 500. Water return channel 325 fluidly communicates water that falls through water-porous conveyor belt 530 through removable skimmer basket 600 and into suction line port 350, for connection to the pump (e.g., 140 of FIG. 5) that provides the suction. In this way, the pump (e.g., 140 of FIG. 5) and the suction line (e.g., 115 of FIG. 5) provide the suction that draws water into skimmer mouth 310 but redirects debris to conveyor debris collector 335 for automated debris removal. Suction line barrier 355 may include one or more axle mounts 320 for mounting the axles of paddle wheel 510 or optional roller 520 to housing 300.

Figure 3C:
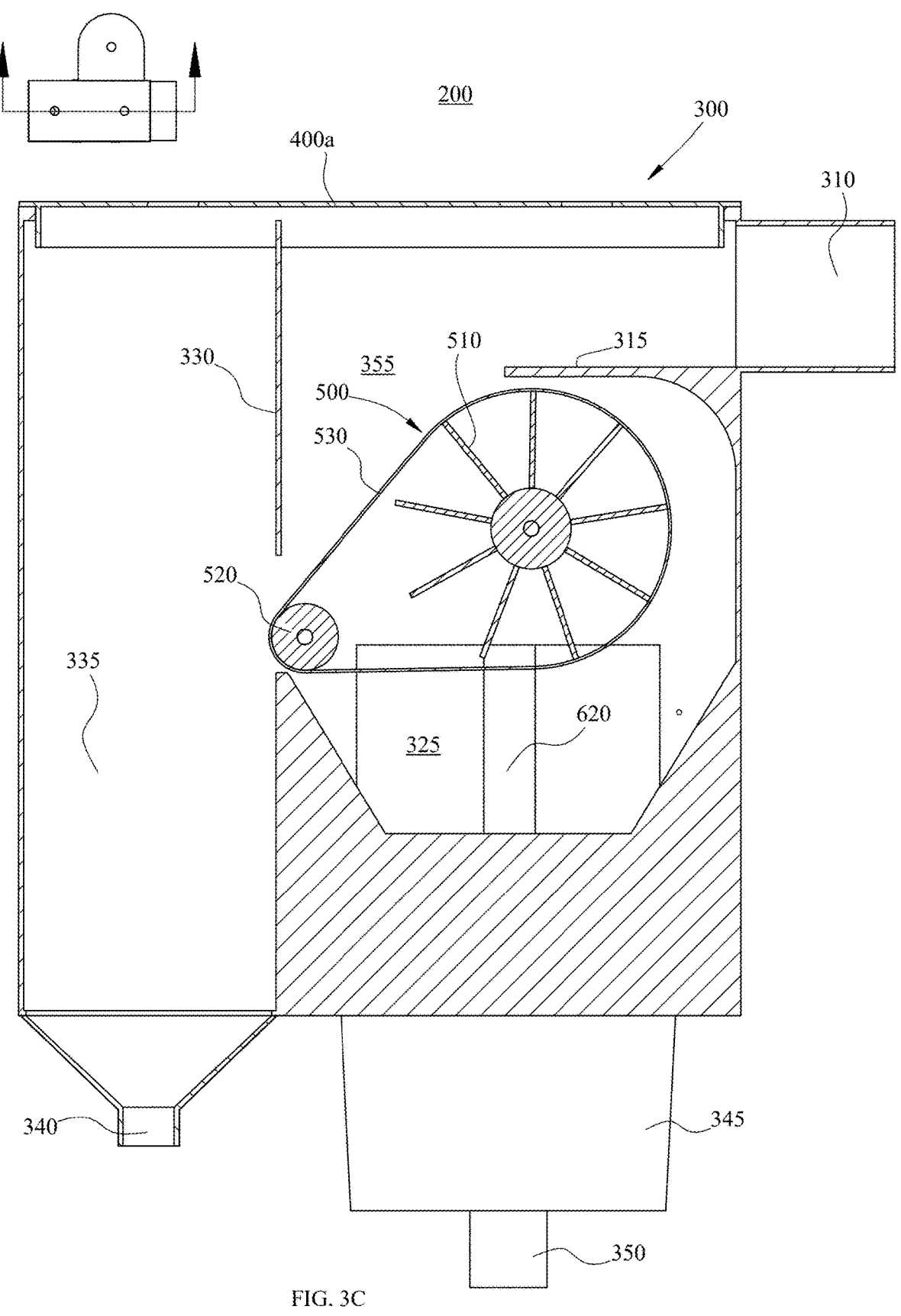
FIG. 3C shows a left side cross-sectional view of the automated skimmer system in accordance with one or more embodiments of the present invention.

Continuing, FIG. 3C shows a left side cross-sectional view of the automated skimmer system 200 in accordance with one or more embodiments of the present invention. Water and debris (not shown) may enter skimmer mouth 310 and traverse conveyor ledge 315. Automated skimmer system 200 may be disposed such that conveyor ledge 315 and at least a portion of skimmer mouth 310 are disposed below the water line (not shown). Conveyor 500 may be at least partially disposed under conveyor ledge 315. Conveyor 500 may include one or more paddle wheels 510, one or more optional rollers 520, and a water-porous conveyor belt 530 disposed about the one or more paddle wheels 510 and the one or more optional rollers 520. As shown in this view, an axle of paddle wheel 510 may be substantially disposed under conveyor ledge 315 to ensure rotation of paddle wheel 510, and water-porous conveyor belt 530, towards conveyor debris collector 335. Housing 300 may include a conveyor debris collector 335 disposed lower than conveyor 500 at a discharge end of conveyor 500 to store debris between automated removals. Conveyor debris collector 335 may include a vacuum connection port 340 that may be fluidly connected to a vacuum for automated removal of debris from conveyor debris collector 335. In this way, water (not shown) entering skimmer mouth 310 may fall off conveyor ledge 315 through conveyor belt 530 causing paddle wheel 510 to rotate and conveyor 500 to direct debris toward conveyor debris collector 335. Housing 300 may include a water return channel 325 that is sufficiently disposed under conveyor 500 such that water falling through conveyor belt 530 may be fluidly communicated to a removable skimmer basket (e.g., 600) disposed within skimmer basket receiver 345 for return to circulation via suction line port 350. In certain embodiments, optional roller 520 may have a diameter smaller than a diameter of paddle wheel 510 and optional roller 520 may be disposed lower than paddle wheel 510 to create a downward flowing direction of conveyor belt 530. One of ordinary skill in the art, having the benefit of this disclosure, will recognize that paddle wheel 510 alone, or one or more paddle wheels 510 in combination with one or more optional rollers 520 may be used in different applications or designs in accordance with one or more embodiments of the present invention. For example, in applications or designs where the debris collector area 335 is disposed further away, one or more optional rollers 520 may be used. Notwithstanding, in some embodiments, the use of a single paddle wheel 510 may be used.

Figure 4:
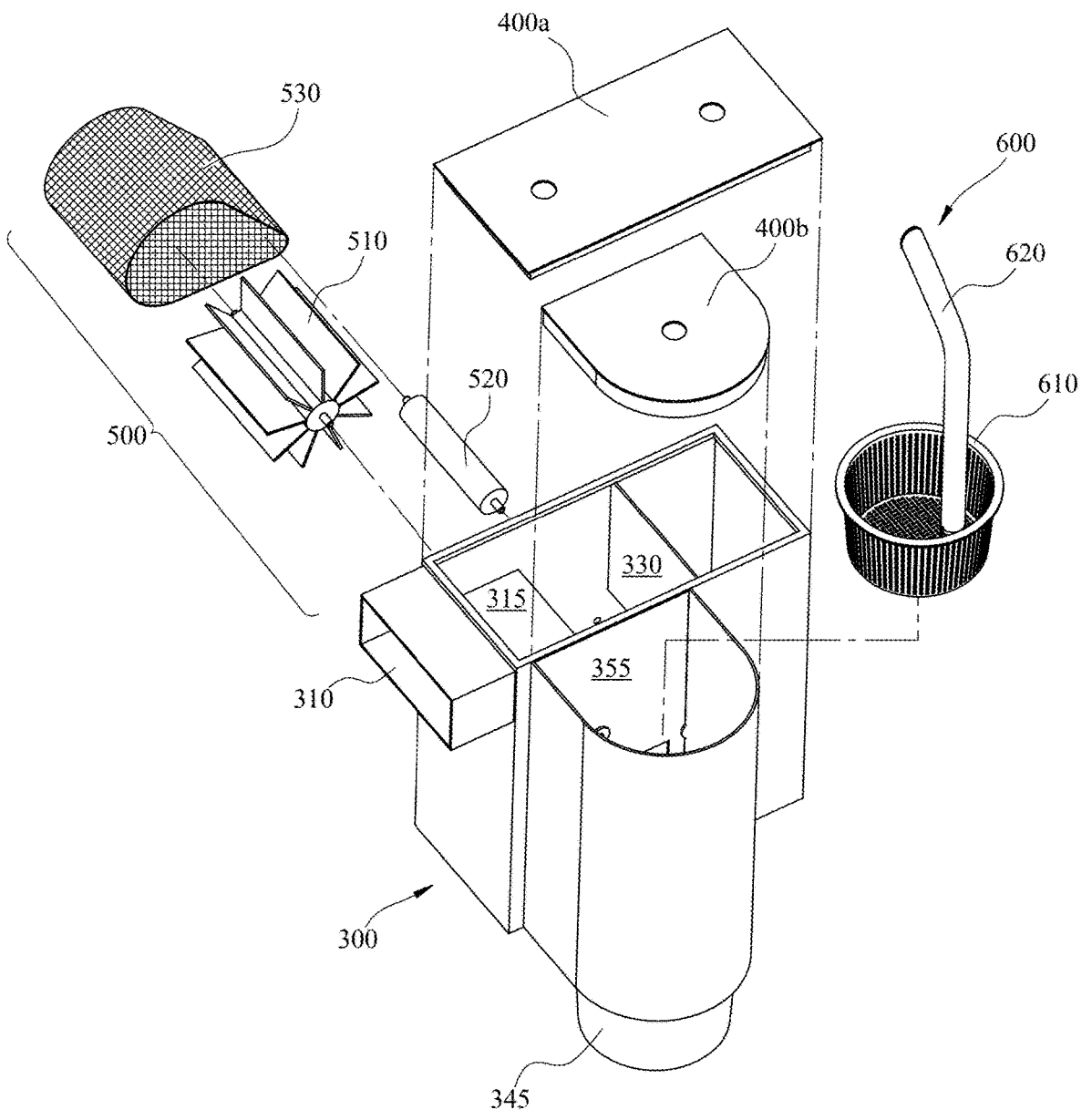
FIG. 4 shows an exploded view of an automated skimmer system in accordance with one or more embodiments of the present invention.

FIG. 4 shows an exploded view of an automated skimmer system 200 in accordance with one or more embodiments of the present invention. In this view, conveyor maintenance lid 400a is shown removed exposing maintenance access to conveyor 500. Conveyor 500 may include one or more paddle wheels 510, one or more optional rollers 520, and water-porous conveyor belt 530. One of ordinary skill in the art, having the benefit of this disclosure, will recognize that paddle wheel 510 may be sized such that it generates sufficient torque to move water-porous conveyor belt 530 over the specific configuration of one or more paddle wheels 510 or one or more optional rollers 520 in accordance with one or more embodiments of the present invention. Depending on the mechanism of attachment, one or more axle mounts (not shown) or spring-loaded axles (not shown) may be used to mount conveyor 500 to housing 300. The use of spring-loaded axles for one or more paddle wheels 510 and one or more optional rollers 520 enables the quick and easy removal of conveyor 500 from automated skimmer system 200, thereby enabling automated skimmer system 200 to operate in a similar manner to a conventional skimmer system (e.g., 100 of FIG. 1) in, for example, months where there is very little debris dropped. In certain embodiments, water-porous conveyor belt 530 may be a woven wire belt. In other embodiments, water-porous conveyor belt 530 may be chain link belt. In still other embodiments, water-porous conveyor belt 530 may be a mesh belt. One of ordinary skill in the art, having the benefit of this disclosure, will recognize that water-porous conveyor belt 530 may have any shape or configuration that permits water to fall through conveyor belt 530 while directing debris toward the discharge end of conveyor 500. Removable skimmer basket 600 may include water-porous basket 610 and an elongated handle 620 that enables easy removal of removable skimmer basket 600 when skimmer basket lid 400b is removed.

Figure 5:
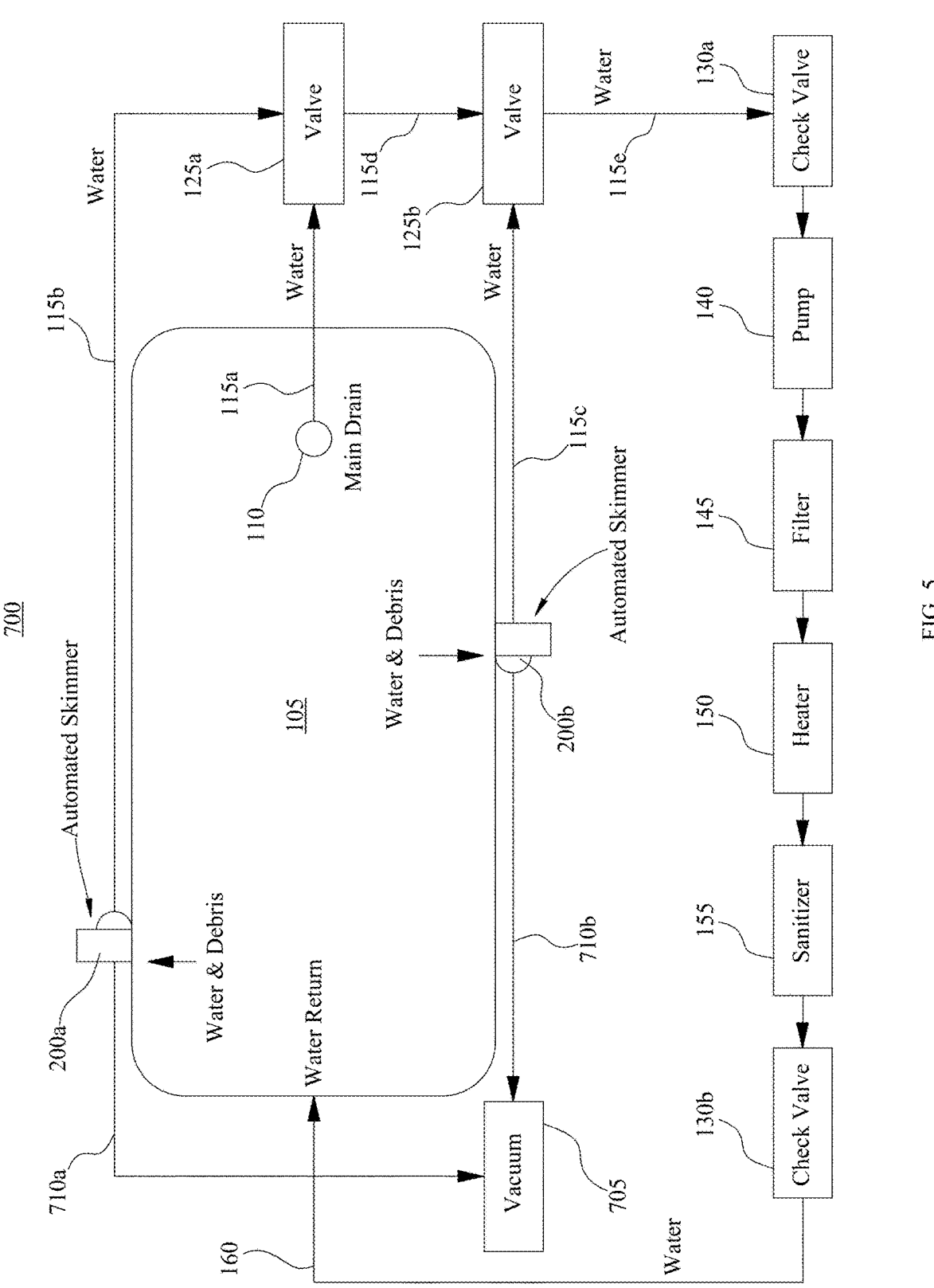
FIG. 5 shows a circulation system with a plurality of automated skimmer systems for a swimming pool or other body of circulated water in accordance with one or more embodiments of the present invention.

FIG. 5 shows a circulation system 700 with automated skimmer systems 200a, 200b for a swimming pool or other body (not shown) of circulated water that is used to prevent stagnation and maintain the cleanliness of the water in accordance with one or more embodiments of the present invention. Similar to a conventional circulation system (e.g., 100 of FIG. 1), circulation system 700 may include one or more main drains 110, suction lines 115, pumps 140, filters 145, optional heaters 150, sanitizers 155, and return jets (not independently illustrated) that work together to circulate water and distribute chemicals that are used to maintain water clarity, balance, and hygiene. However, circulation system 700 may include one or more automated skimmer systems 200 in place of conventional skimmer systems (e.g., 120 of FIG. 1). Circulation system 700 draws water from main drain 110 and the one or more automated skimmer systems 200a, 200b into pump 140, filtration 145, optional heater 150, and sanitizer 155 systems, which are typically disposed outside of pool 105.

Circulation system 700 relies on a plurality of suction lines 115 to draw water into the various subsystems. In the example depicted, suction line 115a is disposed below main drain 110, suction line 115b is disposed below a removable skimmer basket (not independently illustrated) of automated skimmer system 200a, and suction line 115c is disposed below a removable skimmer basket (not independently illustrated) of automated skimmer system 200b. Depending on the design of a particular application, one or more valves 125 may be used to fluidly connect one or more suction lines 115. In the example depicted, valve 125a may fluidly connect suction line 115a and suction line 115b into suction line 115d and valve 125b may fluidly connect suction line 115c and suction line 115d into consolidated suction line 115e. Consolidated suction line 115e may be fluidly connected to check valve 130a that prevents backflow and fluidly connects suction line 115e to pump 140. Pump 140 includes a motor (not shown) that rotates an impeller (not shown) to create a vacuum that pulls water into a chamber (not shown) and then pushes the water out towards the return to pool 105. In this way, pump 140 pulls water from pool 105 via a plurality of suction lines 115 and pushes water through filter 145, optional heater 150, and sanitizer 155, prior to returning the water to pool 105 via one or more return lines 160, thus circulating the pool water back to the pool in a closed-loop system. Filter 145 includes fine screens (not shown) to filter out particulate matter, potentially including bacteria, which bypasses main drain 110 and automated skimmer systems 200a, 200b. Optional heater 150 may be used to increase the temperature of the water, if needed in a particular application. Sanitizer 155, sometimes referred to as a chlorinator, may be used to introduce chemicals to the water to eliminate harmful pathogens, prevent algae growth, maintain water clarity, and balance water chemistry, including, for example, one or more of sanitizers including but not limited to chlorine, alkalinity adjusters, calcium hardness adjusters, algaccides, clarifiers, and shock treatments. Check valve 130*b* may fluidly connect sanitizer 155 to one or more return lines 160 that returns the pool water back into pool 105 via one or more jets (not shown).

As part of the circulation system, each automated skimmer system 200*a*, 200*b* may include a suction line 115*c*, 115*d* disposed under a removable skimmer basket (not shown) that provides suction to draw water into the skimmer mouth (e.g., 310) of automated skimmer systems 200*a*, 200*b*. Suction lines 115*c*, 115*d* suck water through the holes or mesh (not independently illustrated) of the removable skimmer basket (e.g., 600 not shown). However, in contrast to conventional skimmer systems (e.g., 120*a*, 120*b* of FIG. 1), each automated skimmer system 200*a*, 200*b* directs debris along its conveyor (e.g., 500) toward a conveyor debris collector (e.g., 335) area that includes a vacuum connection port (e.g., 340). Each vacuum connection port (e.g., 340) may be fluidly connected to a vacuum line 710*a*, 710*b* that is fluidly connected to a vacuum 705, which may be disposed outside of pool 105 and may be located in the same general area as pump 140, filtration 140, optional heater 150, and sanitizer 155 systems. Vacuum 705 may be, for example, a conventional wet-vacuum or shop-style vacuum that provides sufficient suction to remove debris from the conveyor debris collector (e.g., 335) and provides sufficient storage for the automated removal of a large amount of debris. For example, in certain embodiments, vacuum 705 may include a fifty-five (55) gallon container area, which enables automated removal of debris for days or weeks at a time. In certain embodiments, a conventional control system or timer (not shown) may activate vacuum 705 to remove debris from the conveyor debris collector (e.g., 335) at a predetermined interval. In other embodiments, a conventional control system or timer (not shown) may activate vacuum 705 to remove debris from the conveyor debris collector (e.g., 335) at a predetermined schedule. In still other embodiments, a conventional control system (not shown) may activate vacuum 705 to remove debris from the conveyor debris collector (e.g., 335) based on level sensor data. For example, a sensor (not shown) may be disposed in the conveyor debris collector (e.g., 335) to sense when the debris has sufficiently filled the conveyor debris collector area and activates vacuum 705 for automated debris removal. In this way, debris may be automatically removed from a body of circulated water without requiring manual intervention. While vacuum 705 and its debris storage area (not shown) may require manual intervention, it is selected of a size that permits the unattended and automated removal of debris from pool 105 for extended periods of time of days or even weeks, permitting the caretaker to step away from pool 105 for extended periods of time without concern.

Figure 6A:
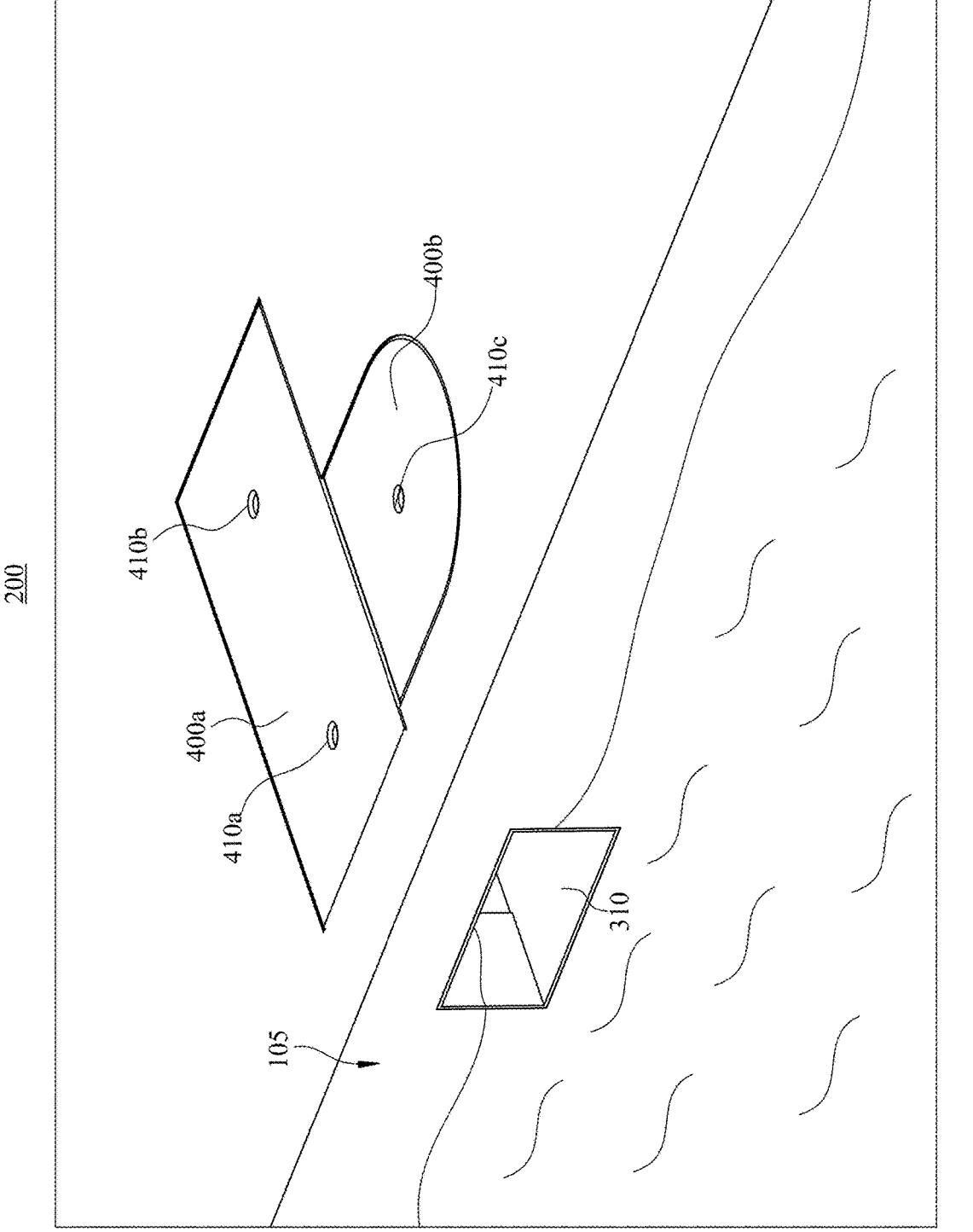
FIG. 6A shows a front-facing perspective view of an automated skimmer system in an environment of use in accordance with one or more embodiments of the present invention.

FIG. 6A shows a front-facing perspective view of an automated skimmer system 200 in an environment of use in accordance with one or more embodiments of the present invention. As shown in this view, skimmer mouth 310 is at least partially disposed below the water line such that water may be drawn into skimmer mouth 310. During normal operative use, conveyor maintenance lid 400*a* and skimmer basket lid 400*b* may be installed protecting the interior.

Figure 6B:
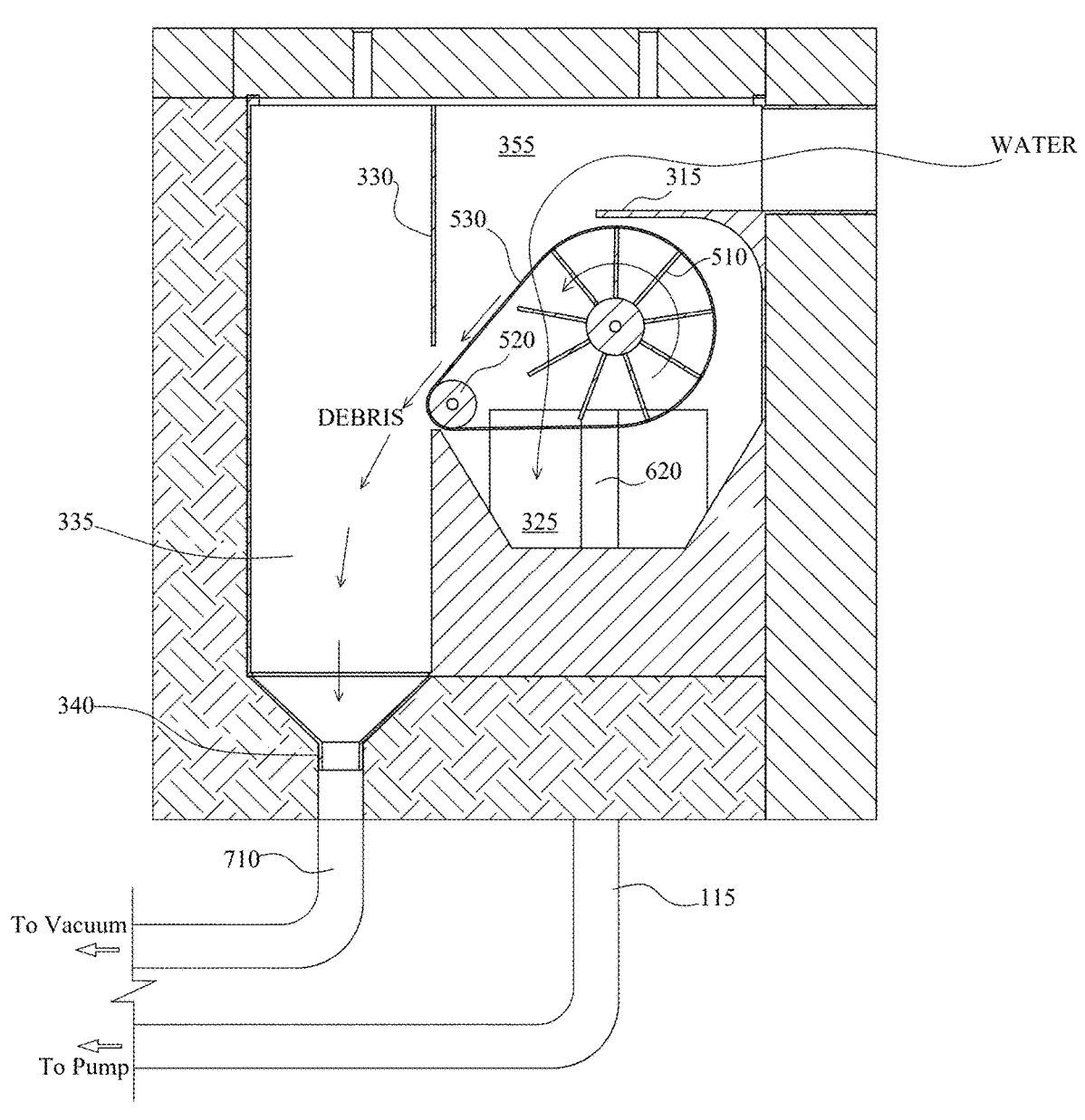
FIG. 6B shows a left side cross-sectional view of the automated skimmer system in an environment of use in accordance with one or more embodiments of the present invention.

Continuing, FIG. 6B shows a left side cross-sectional view of the automated skimmer system 200 in an environment of use in accordance with one or more embodiments of the present invention. As shown in this view, the path of water flowing into skimmer mouth 310, falling off conveyor ledge 315, and through conveyor belt 530 into water return channel 325 is shown. Returning water may be discharged through the suction line port (e.g., 350) through a suction line 115 towards the pump (not shown). As the water falls through conveyor belt 530, paddle wheel 510 may rotate moving conveyor belt 530 towards conveyor debris collector 335. As previously discussed, a vacuum (not shown) may be fluidly connected by vacuum line 710 to vacuum connection port 340 for automated debris removal.

Figure 6C:
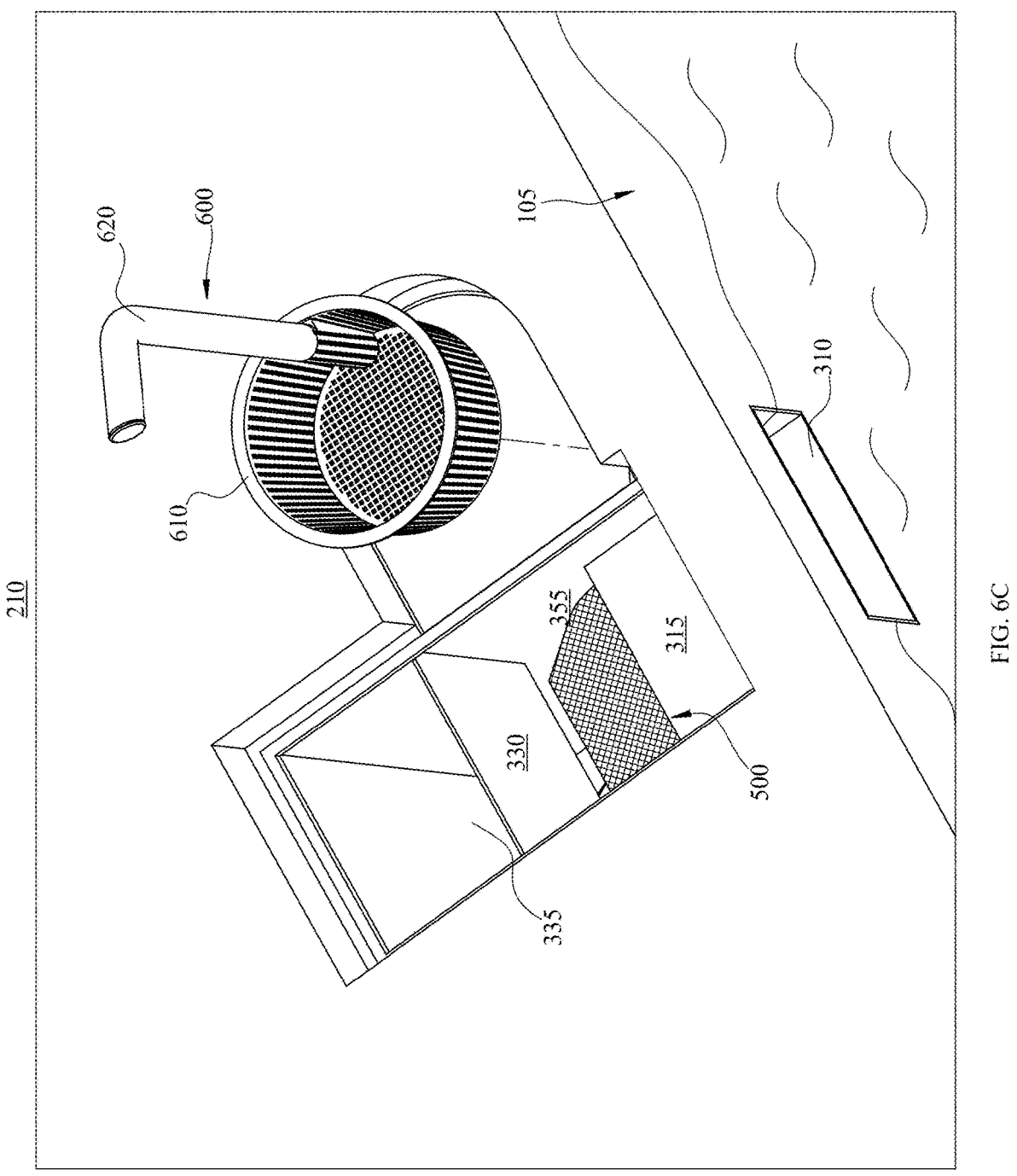
FIG. 6C show removal of the skimmer basket of the automated skimmer system in an environment of use in accordance with one or more embodiments of the present invention.

Continuing, FIG. 6C show removal of removable skimmer basket 600 of the automated skimmer system 200 in an environment of use in accordance with one or more embodiments of the present invention. As shown in this view, the conveyor maintenance lid (e.g., 400*a*) and the skimmer basket lid (e.g., 400*b*) have been removed providing access to the interior of automated skimmer system 200. In certain embodiments, the conveyor 500 may be removed, repaired, and/or replaced. In addition, in this view, a suction line barrier 355 may be seen that provides limited isolation to the path of debris towards conveyor debris collector 335. Similarly, removable basket 600 may be removed by elongated handle 620. While the majority of debris will be directed to conveyor debris collector 335, de minimis, or comparatively small, debris and particulate matter may be anticipated to collect in removable basket 600, however, not in an amount that would clog or otherwise prevent the completely automated maintenance of the pool by operation of automated skimmer system 200.

While the present invention has been described with respect to the above-noted embodiments, those skilled in the art, having the benefit of this disclosure, will recognize that other embodiments may be devised that are within the scope of the invention as disclosed herein. Accordingly, the scope of the invention should only be limited by the appended claims.

The invention claimed is:

1. An automated skimmer system for a pool that does not require manual intervention for an extended period of time comprising:

a skimmer mouth comprising a conveyor ledge disposed below a water line;

a conveyor disposed below the water line and at least partially disposed under the conveyor ledge, the conveyor comprising a non-porous paddle wheel and a water-porous conveyor belt disposed about the paddle wheel;

a conveyor debris collector disposed below the water line and disposed lower than the conveyor at a discharge end of the conveyor, the conveyor debris collector comprising a vacuum connection port;

a removable skimmer basket disposed in a skimmer basket receiver that is disposed offset to the conveyor, wherein the skimmer basket receiver includes a suction port that draws water into the skimmer mouth and onto the conveyor; and a vacuum fluidly connected to the vacuum connection port, wherein water entering the skimmer mouth falls off the conveyor ledge, through the water-porous conveyor belt, onto the non-porous paddle wheel causing the paddle wheel disposed below the water line to rotate and the conveyor belt to direct debris toward the conveyor debris collector.

2. The automated skimmer system of claim 1, further comprising:

a skimmer basket receiver configured to receive a removable skimmer basket, the skimmer basket receiver comprising a suction line port; and a water return channel disposed under the conveyor that fluidly communicates water to the skimmer basket receiver for return to circulation via the suction line port.

3. The automated skimmer system of claim 1, further comprising:

a control system that activates the vacuum to remove debris from the conveyor debris collector at a predetermined interval.

4. The automated skimmer system of claim 1, further comprising:

a control system that activates the vacuum to remove debris from the conveyor debris collector on a predetermined schedule.

5. The automated skimmer system of claim 1, further comprising:

a control system that activates the vacuum to remove debris from the conveyor debris collector based on level sensor data.

6. The automated skimmer system of claim 1, further comprising:

a conveyor debris collector barrier disposed above the discharge end of the conveyor.

7. The automated skimmer system of claim 1, wherein the conveyor further comprises a roller having a diameter smaller than a diameter of the paddle wheel.

8. The automated skimmer system of claim 7, wherein the water-porous conveyor belt is disposed about the paddle wheel and the roller.

9. The automated skimmer system of claim 8, wherein the roller is disposed lower than the paddle wheel.

10. The automated skimmer system of claim 1, wherein the water-porous conveyor belt comprises a woven wire belt.

11. The automated skimmer system of claim 1, wherein the water-porous conveyor belt comprises a chain link belt.

12. The automated skimmer system of claim 1, wherein the water-porous conveyor belt comprises a mesh belt.

13. The automated skimmer system of claim 1, wherein an axle of the paddle wheel is substantially disposed under the conveyor ledge to ensure rotation of the water-porous conveyor belt towards the conveyor debris collector.

* * * * *